(12) United States Patent
Helmes et al.

(10) Patent No.: US 12,105,896 B2
(45) Date of Patent: Oct. 1, 2024

(54) COMPUTER MOUSE MODULE

(71) Applicant: Microsoft Technology Licensing, LLC, Redmond, WA (US)

(72) Inventors: John Franciscus Marie Helmes, Steijl (NL); Paul Kos, Shenzhen (CN); Nicholas Yen-Cherng Chen, Cambridge (GB); Michael Hall, Emsworth (GB); Stephen Edward Hodges, Cambridge (GB); James Alexander Devine, Lancaster (GB); Qing Feng, Shenzhen (CN); Masaaki Fukumoto, Shenzhen (CN)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/042,664

(22) PCT Filed: Sep. 29, 2020

(86) PCT No.: PCT/CN2020/118654
§ 371 (c)(1),
(2) Date: Feb. 23, 2023

(87) PCT Pub. No.: WO2022/067459
PCT Pub. Date: Apr. 7, 2022

(65) Prior Publication Data
US 2023/0376127 A1 Nov. 23, 2023

(51) Int. Cl.
*G06F 3/0354* (2013.01)
*G06F 3/0362* (2013.01)
*G06F 3/039* (2013.01)

(52) U.S. Cl.
CPC ........ *G06F 3/03543* (2013.01); *G06F 3/0362* (2013.01); *G06F 3/039* (2013.01); *G06F 2203/0333* (2013.01)

(58) Field of Classification Search
CPC .... G06F 3/03543; G06F 3/0362; G06F 3/039; G06F 2203/0333
See application file for complete search history.

(56) References Cited

U.S. PATENT DOCUMENTS

| 6,590,563 | B1 | 7/2003 | Oross et al. |
| 7,071,921 | B2 | 7/2006 | Hsu |

(Continued)

FOREIGN PATENT DOCUMENTS

| CN | 101446867 A | 6/2009 |
| CN | 206684698 U | 11/2017 |

(Continued)

OTHER PUBLICATIONS

"Final Office Action Issued in U.S. Appl. No. 17/933,039", Mailed Date: Aug. 29, 2023, 25 Pages.

(Continued)

*Primary Examiner* — Hong Zhou
(74) *Attorney, Agent, or Firm* — Barta Jones, PLLC

(57) ABSTRACT

A computer mouse module comprising a power supply component; a movement sensor, an encoder operable to encode data collected by the movement sensor, a transmitter for transmitting the encoded data to a computer and a physical connector for detachably attaching a handle portion to the computer mouse module. The computer mouse module may be attached to the handle portion to form a functioning mouse where a user grips the mouse handle portion to control the mouse.

20 Claims, 26 Drawing Sheets

(56) References Cited

U.S. PATENT DOCUMENTS

| | | | |
|---|---|---|---|
| 7,924,266 | B2 | 4/2011 | Larsen |
| 2002/0126091 | A1 | 9/2002 | Rosenberg |
| 2004/0041787 | A1 | 3/2004 | Graves |
| 2005/0110779 | A1 | 5/2005 | Huang et al. |
| 2005/0146500 | A1 | 7/2005 | Cheng |
| 2007/0132733 | A1 | 6/2007 | Ram |
| 2008/0150898 | A1 | 6/2008 | Low et al. |
| 2008/0231599 | A1 | 9/2008 | Hiromori |
| 2009/0033626 | A1 | 2/2009 | Yung et al. |
| 2009/0122012 | A1* | 5/2009 | Bohn ............... G06F 3/03543 345/163 |
| 2009/0189861 | A1 | 7/2009 | Ledbetter et al. |
| 2010/0231514 | A1 | 9/2010 | Min-liang et al. |
| 2010/0315336 | A1 | 12/2010 | Butler et al. |
| 2011/0205158 | A1* | 8/2011 | Hsu ................... G06F 3/03543 345/164 |
| 2012/0050163 | A1 | 3/2012 | Shih et al. |
| 2012/0319952 | A1 | 12/2012 | Ho |
| 2013/0154932 | A1* | 6/2013 | Liu .................... G06F 3/03543 345/163 |
| 2014/0066826 | A1 | 3/2014 | Akihisa |
| 2015/0138093 | A1* | 5/2015 | Young ................ G06F 3/0312 345/166 |
| 2015/0193023 | A1 | 7/2015 | Odgers |
| 2017/0131791 | A1 | 5/2017 | Yin |
| 2019/0064940 | A1* | 2/2019 | Lu ........................... G06F 3/033 |
| 2019/0187819 | A1* | 6/2019 | Ullrich ................. G06F 3/0354 |
| 2019/0250725 | A1 | 8/2019 | Jiang et al. |
| 2020/0209981 | A1 | 7/2020 | Unnikrishnan et al. |
| 2021/0064154 | A1* | 3/2021 | Bustamante .......... H04L 67/125 |

FOREIGN PATENT DOCUMENTS

| | | |
|---|---|---|
| EP | 2426577 A1 | 3/2012 |
| WO | 2009038432 A2 | 3/2009 |
| WO | 2022067459 A1 | 4/2022 |

OTHER PUBLICATIONS

"Dell Bluetooth Mouse—WM615", Retrieved from: https://www.amazon.in/Dell-WM615-Bluetooth-Mouse/dp/B00W77BKEY, Jun. 17, 2016, 7 Pages.

"Lenovo Bluetooth, USB Yoga Mouse with Laser Presenter", Retrieved From: https://www.amazon.in/Lenovo-Yoga-Mouse-Laser-Presenter/dp/B07WVLCC84?th=1, Aug. 19, 2019, 1 Page.

"Newtral Mouse—The Ergonomic Mouse", Retrieved From: https://www.newtralmouse.eu/english, Jul. 24, 2020, 10 Pages.

"Vacally Ultra-Thin 180° Rotatable Hinge Touch Roller Wireless Mouse Sensitive 1200Dpi 2.4G Wireless Mouse Ergonomic Design Non-Slip Mouse", Retrieved from: https://www.amazon.in/Vacally-Ultra-Thin-Rotatable-Sensitive-Ergonomic/dp/B07SKM4SKJ, May 25, 2019, 3 Pages.

"Non Final Office Action Issued in U.S. Appl. No. 17/933,039", Mailed Date: Feb. 9, 2023, 19 Pages.

George, C., "9 Best Alternatives to a Regular Mouse (from an Ergonomist)", Retrieved From: https://web.archive.org/web/20211103164805/https://ergonomictrends.com/best-regular-mouse-alternatives/, Nov. 3, 2021, 15 Pages.

"International Search Report and Written Opinion Issued in PCT Application No. PCT/CN20/118654", Mailed Date: Jun. 30, 2021, 10 Pages.

Mjayan, Sri P., "Launch of T-Slide Developed by ICFOSS", Retrieved from: https://icfoss.in/news-details/62, May 16, 2018, 2 Pages.

"2.4 GHz Wireless Foldable Folding Arc Mice Optical Portable Mouse With USB Receiver for Laptop Notebook PC Computer MacBook, Black LBQ", Retrieved from: https://www.jumia.com.ng/generic-2.4-ghz-wireless-foldable-folding-arc-mice-optical-portable-mouse-with-usb-receiver-for-laptop-notebook-pc-computer-macbook-black-lbq-111400145.html Retrieved on: Apr. 3, 2023, 4 Pages.

"Supplementary Search Report and Written Opinion Issued in European Application No. 20955487.2", Mailed Date: Oct. 4, 2023, 13 Pages.

Extended European Search Report received for EP Application No. 20955487.2, mailed on Jan. 17, 2024, 14 pages.

Communication pursuant to Rules 70(2) and 70a(2) Received in European Patent Application No. 20955487.2, mailed on Feb. 6, 2024, 1 page.

Non-Final Office Action mailed on Dec. 13, 2023, in U.S. Appl. No. 17/933,039, 22 pages.

Final Office Action mailed on Jun. 20, 2024, in U.S. Appl. No. 17/933,039, 26 pages.

* cited by examiner

COMPUTER MOUSE MODULE

BACKGROUND

A computer mouse is generally a hand-held device that detects two-dimensional (2D) motion relative to a surface. A computer mouse is an input device for a computer and the 2D motion detected by the mouse is input into the computer and used to control a pointer of a graphical user interface associated with the computer. There have been variations upon the original wired computer mouse including: wireless computer mice that transmit data to a computer via infrared radiation or radio including Bluetooth™ and Wi-Fi™; foldable computer mice, such as the Microsoft™ wireless Arc Mouse™ that can be folded to increase portability; and ergonomic computer mice, such as the Microsoft™ Sculpt Ergonomic Mouse™ at are designed to increase comfort and avoid injuries such as carpal tunnel syndrome or other repetitive strain injuries. Ergonomic mice are designed to avoid injuries but may not provide an accessible design suitable for use by someone who has a limitation in their motor skills which may occur for a wide variety of reasons, such as neurological disorders like Cerebral Palsy and Parkinson's disease.

The examples described below are not limited to implementations which solve any or all of the disadvantages of known mice.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

According to a first aspect there is a computer mouse module comprising a power supply component, a movement sensor, an encoder operable to encode data collected by the movement sensor, a transmitter for transmitting the encoded data to a computer, and a physical connector for detachably attaching a handle portion to the computer mouse module.

The computer mouse module may further comprise a scroll wheel portion. The scroll wheel portion may comprise a scroll wheel or a scroll wheel connector for detachably attaching a scroll wheel to the computer mouse module.

The scroll wheel may have a rim that is reconfigurable. Rims of different thicknesses may be detachably attached to alter the diameter of the scroll wheel.

The computer mouse module may further comprise a button portion. The button portion may comprises one or more mouse buttons, or one or more mouse buttons connectors for detachably attaching mouse buttons to the computer mouse module. Each mouse button may comprise a button, a touch sensitive area, a visual display or an actuator.

The computer mouse module may further comprise one or more electrical connections configured to supply power to the handle portion.

The computer mouse module may further comprise one or more electrical connections configured to transmit a control signal to and/or from the handle portion.

The computer mouse module may further comprise hardware logic. The hardware logic is operable to transmit a control signal to the handle portion instructing the handle portion to initiate a vibration function.

The button portion may be located towards a first end of the computer mouse module. The physical connector may be located towards a second end of the computer mouse module. The first end may be opposite to the second end. The computer mouse module may further comprise one or more magnets at the second end.

The physical connector may be a channel in the computer mouse module arranged to receive a projection of the handle portion.

The physical connector may further comprise one or more biased projections extending from the physical connector.

The diameter of the scroll wheel may be adjustable while the scroll wheel remains within the computer mouse module.

The computer mouse module may further comprise one or more removable modules, Each removable module may provide the functionality of a scroll wheel, a touch sensitive area, a mouse button, a display or an actuated surface.

The power supply component may comprise at least one of a battery, a battery compartment for receiving a battery, or a wired connection for receiving power from a power supply.

According to a second aspect there is a computer mouse comprising a handle portion and a computer mouse module. The handle portion comprises a physical connector. The computer mouse module, wherein the computer mouse module comprises a power supply component, a movement sensor, an encoder operable to encode data collected by the movement sensor, a transmitter for transmitting the encoded data to a computer and a physical connector. The handle portion physical connector engages with the computer mouse module physical connector to detachably attach the handle portion to the computer mouse module.

The handle portion may be manufactured using an additive manufacturing technique. The handle portion may extend around at least two surfaces of the computer mouse component. The computer mouse module may be electrically connected to the handle portion and is arranged to provide electrical power to the handle portion. The electrical connections may be located on the physical connection of the handle portion and the physical connection of the computer mouse module.

According to a third aspect there is method for assembling a computer mouse comprising detachably attaching a handle portion to a computer mouse module. The computer mouse module comprises a power supply component, a movement sensor, an encoder operable to encode data collected by the movement sensor, a transmitter for transmitting the encoded data to a computer, and a physical connector. The handle portion comprises a physical connector that is reciprocal to the physical connector of the computer mouse module.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Figure 1:
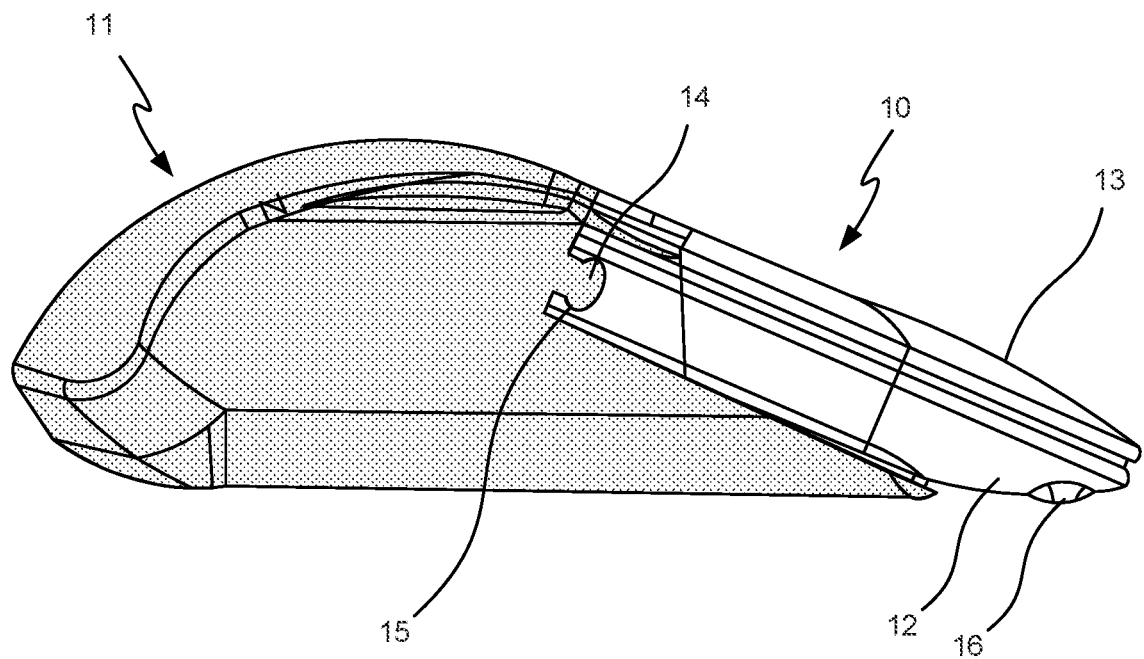
FIG. 1 is a side view of a first exemplary computer mouse that includes a mouse module.

FIG. 1 is a side view of a first exemplary computer mouse that includes a mouse module 10 and a handle portion 11. The mouse module 10 is detachable from and reattachable to the handle portion 11. Contrary to contemporary mice, the handle portion may be passive, while all active components are provided in the mouse module 10. The mouse module 10 includes a movement sensor 12, such as an optical sensor or a roller ball. The movement sensor is contained with the body of the mouse module. The optical sensor may be proximal to a surface upon which the mouse is to be moved or, alternatively, an optical sensor may be set back from the edge of the module 10 but directed towards a surface upon which the mouse is to be moved. Movement detected by the movement sensor 12 is encoded by an encoder (not shown in FIG. 1) within the mouse module 10 and the encoded data is transmitted to a computer by a transmitter (not shown in FIG. 1). Within the body of the mouse module 10 is a battery compartment that may house a battery. The battery may be non-removable from the mouse module 10 or removable and externally replaceable. One or more batteries may be included in series or in parallel. The battery powers the mouse module 10 and the components therein. The mouse module 10 has a physical connector 14 that is engageable with a physical connector 15 of the handle portion 11. The battery is an example of a power supply component that is operable, either alone or with other devices, to power components within the mouse module. The foregoing description will generally follow this present example with a battery or battery compartment as a power supply component, however a power supply component may comprise at least one of a battery, a battery compartment for receiving a battery, or a wired connection, such as a USB connection, for receiving power from a power supply, such as a computer. Such a battery or battery compartment may be substituted with a different power supply component in any of the foregoing examples. If a mouse module is connectable by wired means then the mouse module may include an attached wired connection or a connection, e.g. a USB connection, for receiving a cable, e.g. a USB cable. The mouse module 10 further comprises a projection 16 for contacting a surface upon which the mouse module may be moved. The shape of the physical connector 14 of the mouse module 10 is reciprocal to the shape of the physical connector of the handle portion 11 so that when the physical connectors 14, 15 are engaged, the mouse is usable to a person holding the handle portion 11. The handle portion 11 is for holding, grasping and manipulating the mouse. In the example of FIG. 1, the movement sensor 12 is positioned to be directed towards a surface upon which the mouse is moved and the length of the mouse module 10 is supported by the handle portion 11 to be at an angle with the surface when the mouse is formed. In the example illustrated in FIG. 1, mouse buttons 13 are provided at the front of the mouse module 10.

Figure 2A:
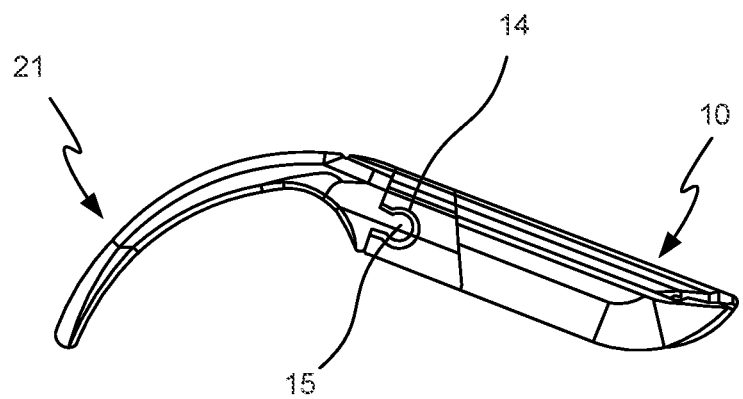
FIG. 2A is a side view of a second exemplary computer mouse that includes a mouse module.

FIG. 2A is a side view of a second exemplary computer mouse that includes a mouse module 10. The mouse module 10 has a physical connector 14 that engages with a physical connector 15 of a handle portion 21. The handle portion 21 is arc shaped. The mouse of FIG. 2A is designed to be used on a relatively flat surface and a front part of the mouse module 10 and a rear part of the handle portion 21 contact the surface while the middle section of the mouse is supported above the surface forming a bridge. The bridge shape angles the mouse module 10 so that a movement sensor of the mouse module 10 is proximal to the surface.

Figure 2B:
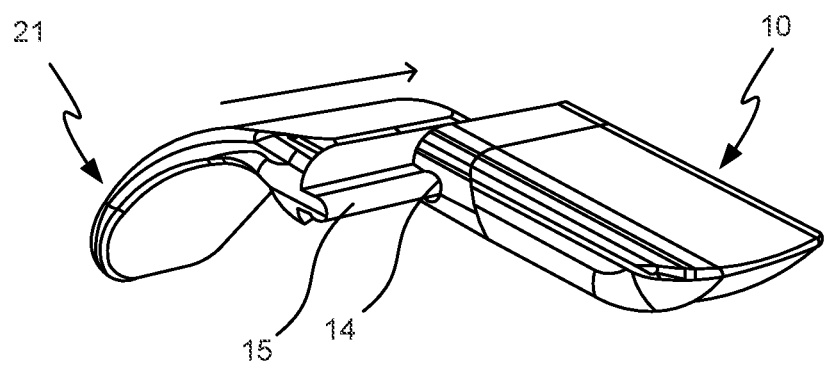
FIG. 2B is an isometric view of the second exemplary computer mouse that includes a mouse module.

FIG. 2B is an isometric view of the second exemplary computer mouse that is illustrated in FIG. 2A. The mouse module 10 is shown in a state of sliding engagement with the handle portion 21, whereby the handle portion 21 is moved in the direction of the arrow towards the mouse module 10 in order to detachably attach the mouse module 10 with the handle portion 21.

Figure 3A:
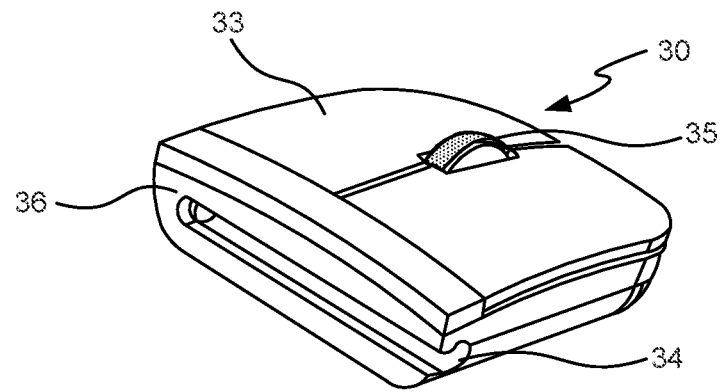
FIG. 3A is an isometric view of a mouse module with a horizontal physical connector.
Figure 3B:
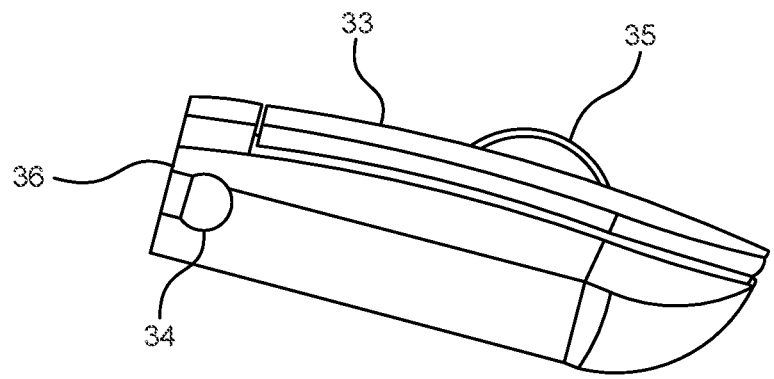
FIG. 3B is a side view of the mouse module of FIG. 3A.
Figure 3C:
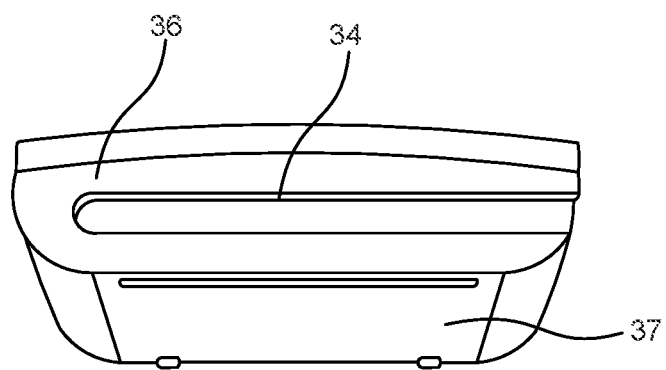
FIG. 3C is a rear view of the mouse module of FIG. 3A.

FIGS. 3A, 3B and 3C illustrate an isometric view, a side view and is a rear view of a mouse module 30 with a horizontal physical connector 34. In this example, the mouse module 30 has physical buttons 33 and a physical scroll wheel 35. In other examples, the buttons and scroll wheel functionality may be provided by one or more touch sensitive surfaces and, optionally, haptic feedback is provided for a button click and a mouse scroll vibration via a haptic module (not shown). The physical connector 34 of the mouse module 30 is a channel across the mouse module 30 that is partially open to a rear surface 36 of the mouse module 30 to allow a physical connector of a handle portion to be inserted into the channel thereby securely engaging the mouse module 30 with the handle portion to form a mouse. In the illustrated example, the physical connector is a female connector, however it is within the scope of this disclosure to have a male connector forming part of the mouse module 30 and a handle portion having a reciprocal female connector. Additional connection means are described later in the Detailed Description section. FIG. 3C illustrates a removable panel 37 on a bottom surface of the mouse module 30 that is removable to access one or more batteries used to power the mouse module 30.

Figure 4:
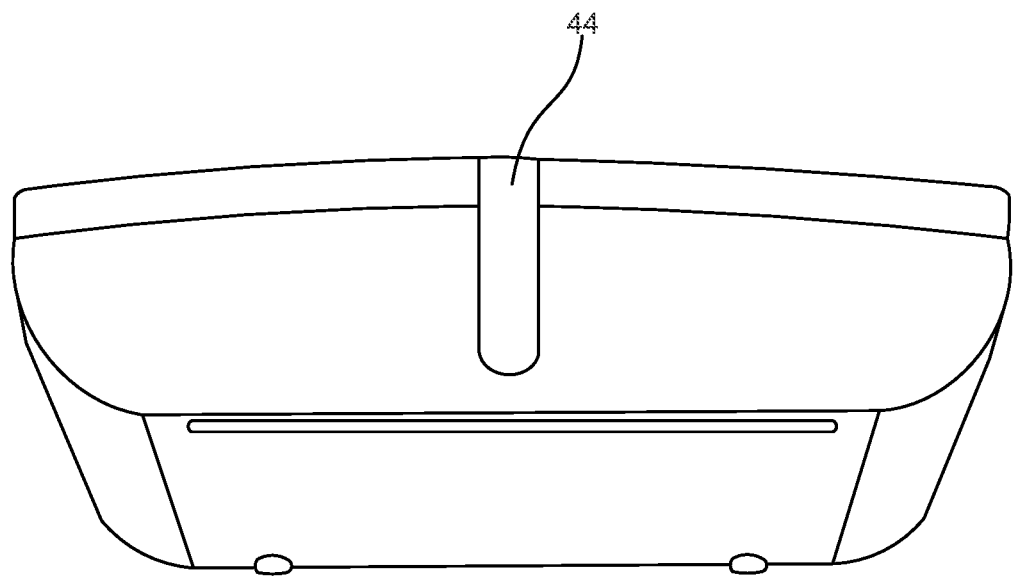
FIG. 4 is a rear view of a mouse module with a single vertical physical connector.
Figure 5:
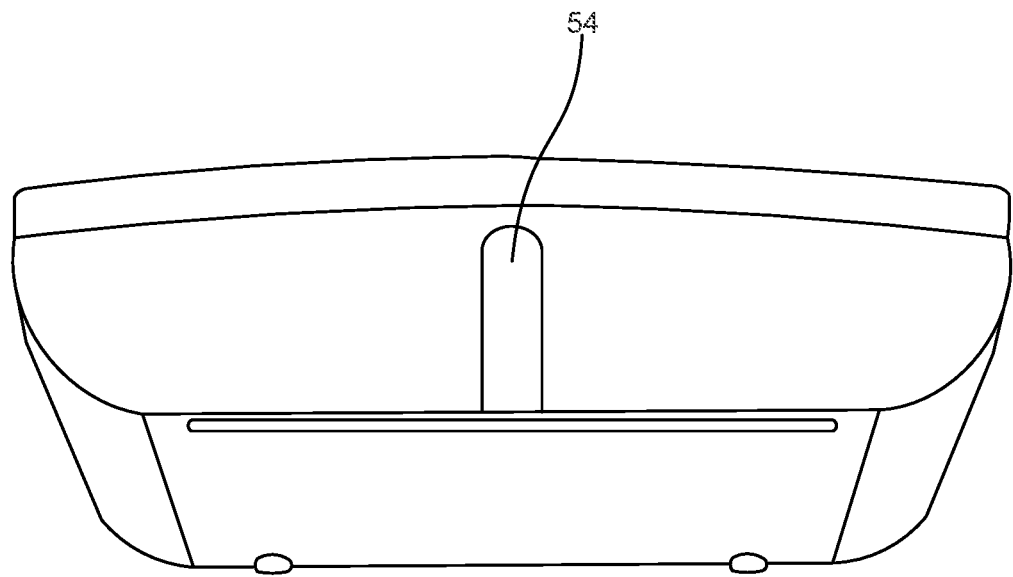
FIG. 5 is a rear view of a mouse module with an alternative single vertical physical connector.
Figure 6:
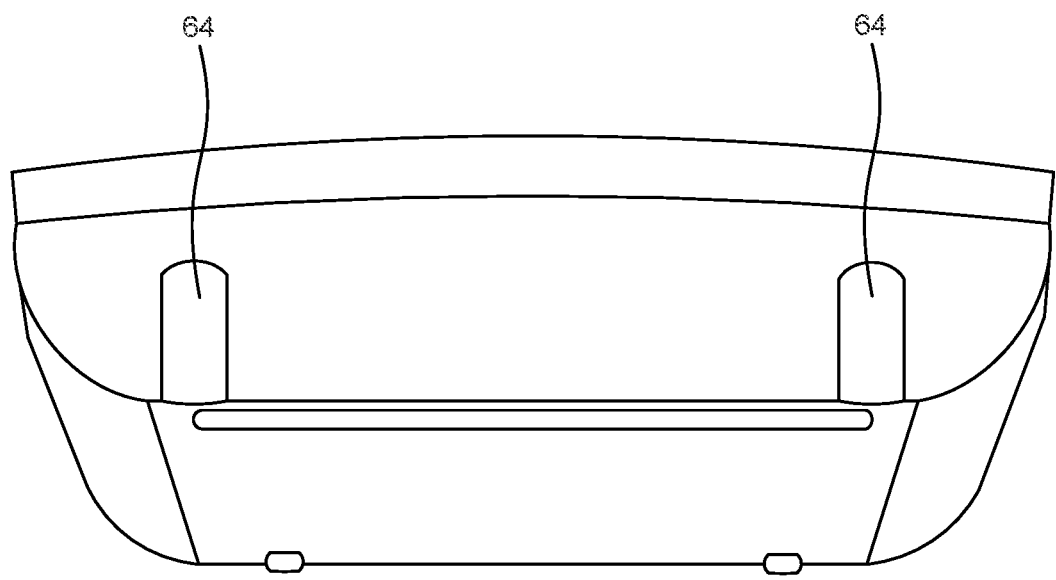
FIG. 6 is a rear view of a mouse module with dual vertical physical connectors.

FIGS. 4 to 6 illustrate alternative examples of physical connectors 44, 54, 64 for a mouse module. FIG. 4 illustrates a mouse module with a single vertical physical connector 44 formed by a slot whereby a mouse handle portion connector will slide down from a top surface for the mouse module to engage the handle portion with the mouse module. FIG. 5 illustrates a rear view of a mouse module with an alternative single vertical physical connector 54 whereby a physical connector of a handle portion will be inserted from an opposite side to the handle portion of FIG. 4. These illustrated alternative handle portion engagement means illustrated in FIGS. 4 and 5 enable different uses of mouse modules whereby, when the mouse modules are in use, forces are created in opposing directions and these forces may be best resisted by one of the two illustrated mouse modules. FIG. 6 is a rear view of a mouse module with dual vertical physical connectors 64 and illustrates that multiple physical connectors may be used with a mouse module. Although two such connectors are illustrated in FIG. 6, it is envisaged that more than two connectors may be utilized by a mouse module and that the angles of the multiple physical connectors may be orthogonal rather than horizontal as illustrated in FIG. 6 thereby allowing different ways to connect a mouse handle portion to a mouse module.

Figure 7:
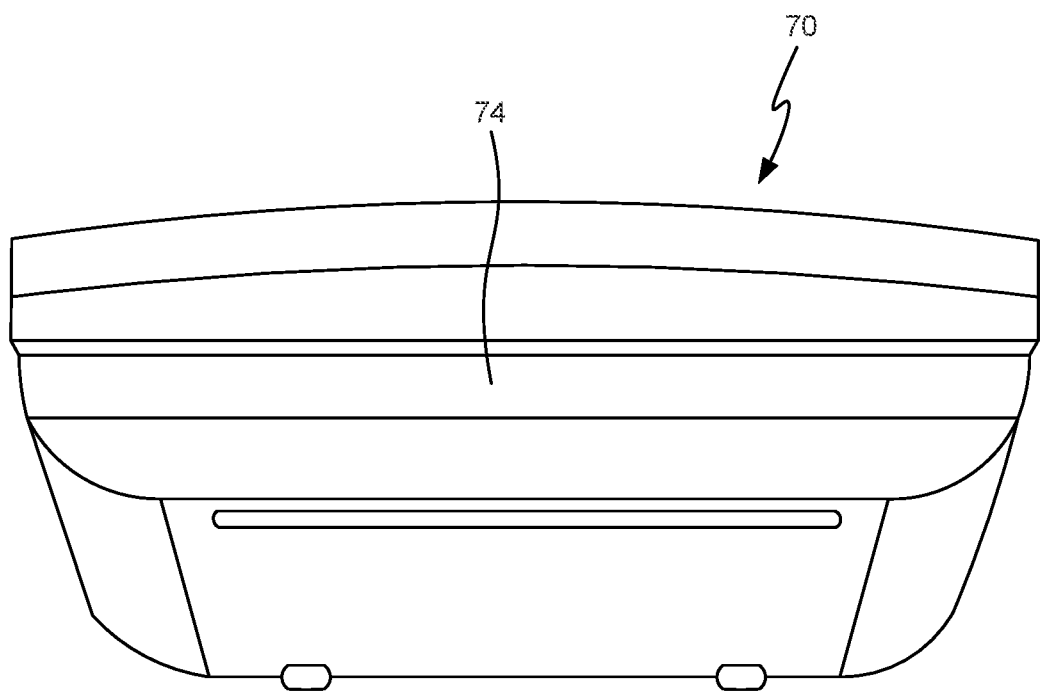
FIG. 7 is a rear view of a mouse module with a horizontal physical connector across the width of the mouse module.

FIG. 7 is a rear view of a mouse module 70 with a horizontal physical connector 74 across the full width of the mouse module so that a physical connector of a handle portion may be inserted from either side of the mouse module 70 in order to form a mouse. This provides both a more customizable mouse design and also makes either left-handed or right-handed mice easier to support with complex handle portion shapes.

Figure 8:
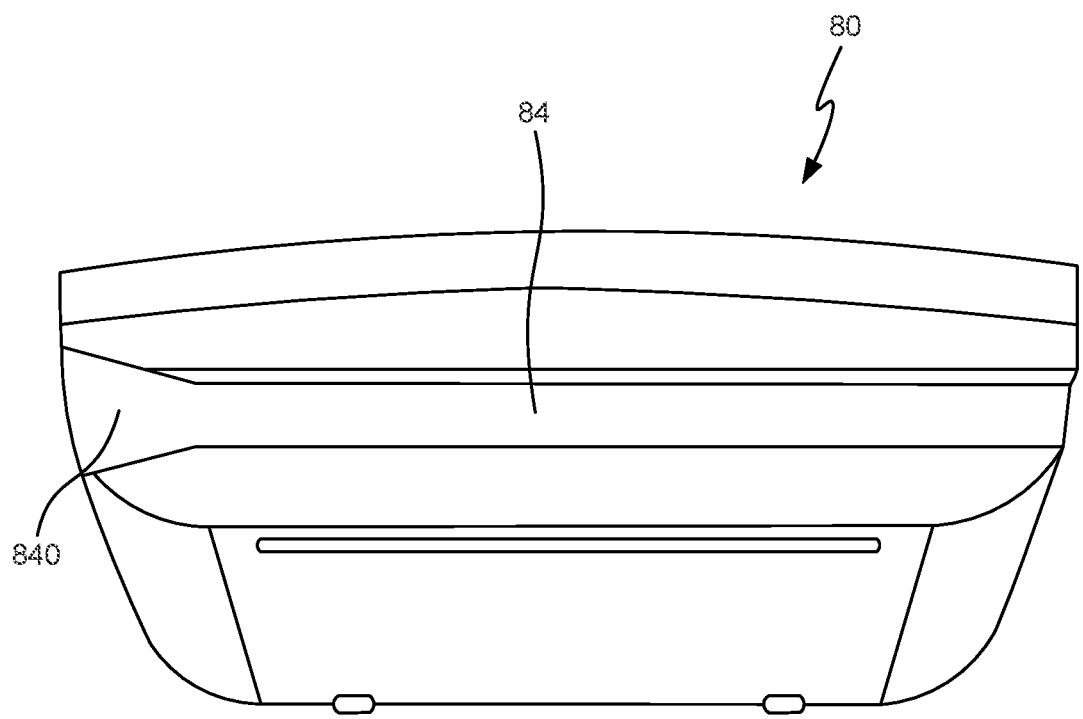
FIG. 8 is a rear view of a mouse module with a horizontal physical connector across the width of the mouse module where the physical connector has a widened mouth.

FIG. 8 is a rear view of a mouse module 80 with a horizontal physical connector 84 across the width of the mouse module 80 where the physical connector 84 has a widened mouth 840. The widened mouth 840 facilitates insertion of a physical connector of a mouse handle portion in the channel and thereby allows for anyone to insert a handle portion with increased ease as well as being an accessibility feature for people who may have reduced dexterity in their hands. The widened mouth 840 of FIG. 8 may be applied to any channel opening disclosed in this document.

Figure 9:
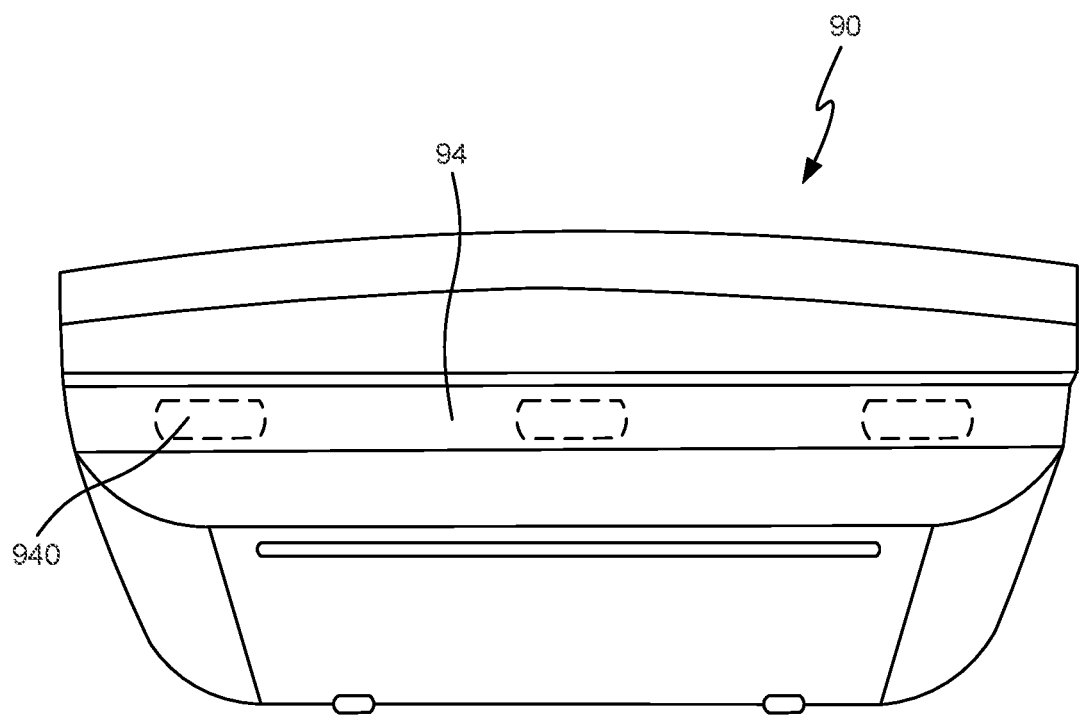
FIG. 9 is a rear view of a mouse module with a horizontal physical connector across the width of the mouse module with magnets internal to the mouse module.

FIG. 9 is a rear view of a mouse module 90 with a horizontal physical connector 94 across the width of the mouse module 90 with a plurality of magnets 940 internal to the rear of the mouse module 90 so that the magnets 940 are proximal to a surface of the handle portion when the mouse is assembled. The handle portion will have co-located magnets or a metal portion that would be magnetically attracted to the magnets in the mouse module 90. The magnetic force between the mouse module 90 and a handle portion will help retain the engagement of the physical connectors while an assembled mouse is in use. While FIG. 9 illustrates magnets 940 forming part of the mouse module 90, this disclosure extends to an example where one or more magnets are located in a handle portion or if magnets arc included with any of the other described or illustrated mouse module examples.

Figure 10:
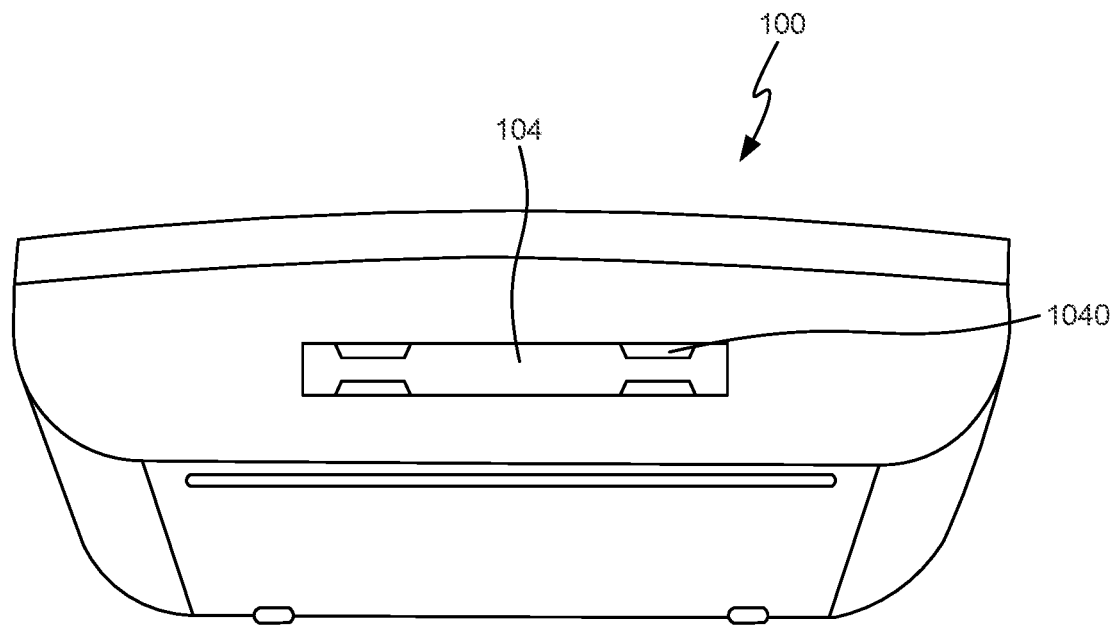
FIG. 10 is a rear view of a mouse module with a horizontal socket physical connector with a plurality of notches.

FIG. 10 is a rear view of a mouse module 100 with a horizontal socket physical connector 104 with a plurality of notches 1040. In this example, there is no sliding engagement of a handle portion and a mouse module from a side, rather a projection from the handle portion is inserted into the socket 104 of the mouse module. When inserted, each notch 1040 engages with recesses on a physical connector of a handle portion in order to maintain engagement between the handle portion (not shown) and the mouse module 100. The notches may be biased to remain extending from the socket 104. The illustrated example has four notches, however this number is not intended to be limiting for the present disclosure. The biasing may be provided by spring loading the notches.

Figure 11:
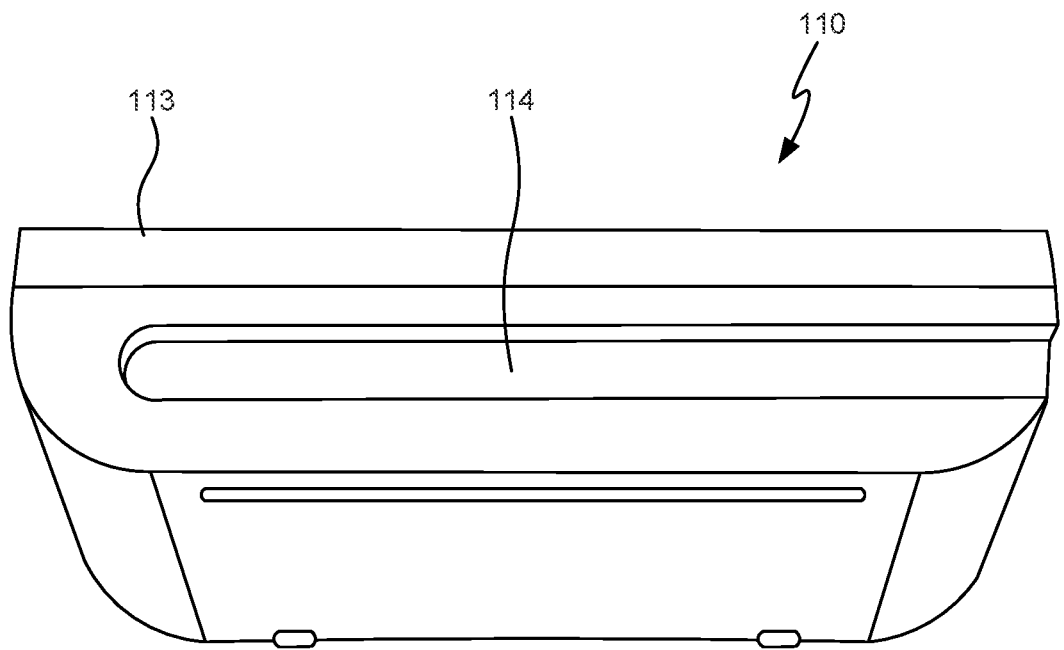
FIG. 11 is a rear view of a mouse module with a flat top profile.

FIG. 11 is a rear view of a mouse module 110 with a flat top profile. The flat top 113 allows for a handle portion to more easily extend over the top of the mouse module 110 from the rear of the mouse module and also to form a more secure and stable fit between the mouse module and mouse handle portion that are to form a mouse. In this illustrated example, there is a socket 114 to allow sliding attachment of a handle from a side.

Figure 12:
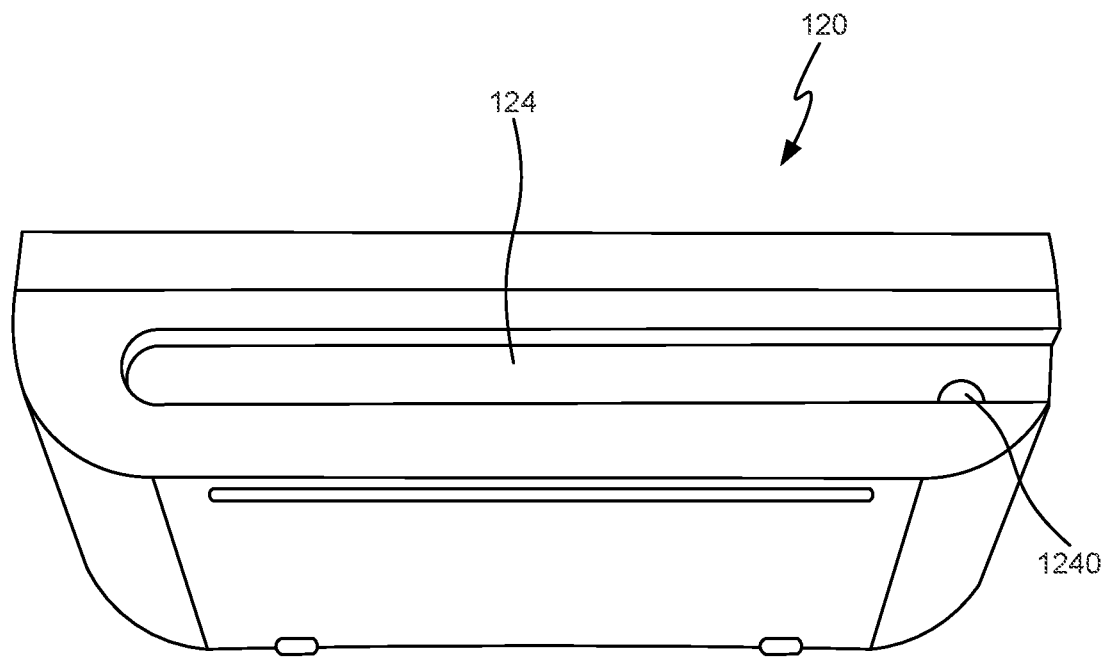
FIG. 12 is a rear view of a mouse module with a notch projecting within the physical connector.

FIG. 12 is a rear view of a mouse module 120 with a notch 1240 projecting within a channel of a physical connector 124. The notch 1240 is biased to remain extending into the channel to provide a more secure engagement between the mouse module 120 and a handle portion. The notch may be biased with the inclusion of a spring-loaded mechanism not illustrated in the figure.

Figure 13:
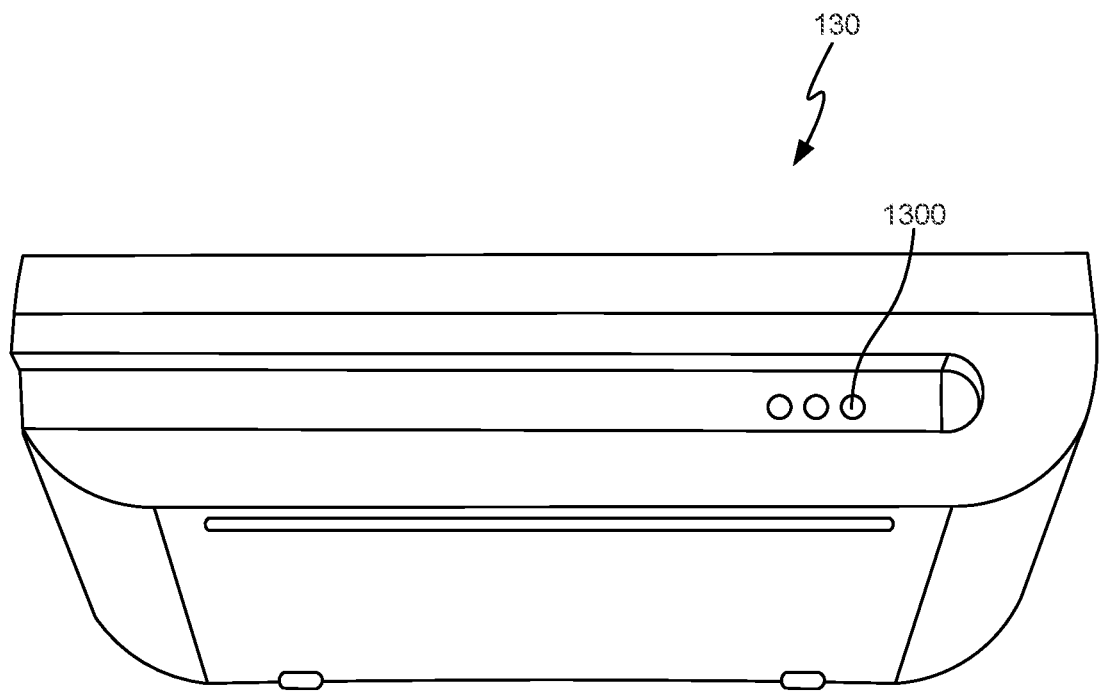
FIG. 13 is a rear view of a mouse module with a plurality of electrical connectors provided within the physical connector.

FIG. 13 is a rear view of a mouse module 130 with a plurality of electrical connectors 1300 provided within a physical connector. The electrical connectors may provide power to a device within a handle portion. Alternatively, or in addition, the electrical connectors 1300 may transmit one or more control signals to a device within a handle portion. In one example, the electrical connectors 1300 received signals from a device within an attached handle portion. A handle portion for use with mouse module 130 has corresponding electrical connectors that engage with the electrical connectors of the mouse module 1300 enabling power and/or signals to be transmitted between the two components. Three electrical connectors 1300 are illustrated in FIG. 13 but there may be more or less than three electrical connectors provided. A device within a handle portion may be able to generate vibrations that are used to provide feedback to a user of the mouse, or to provide a constant stimulation to a user so that the user can better control the mouse.

Figure 14:
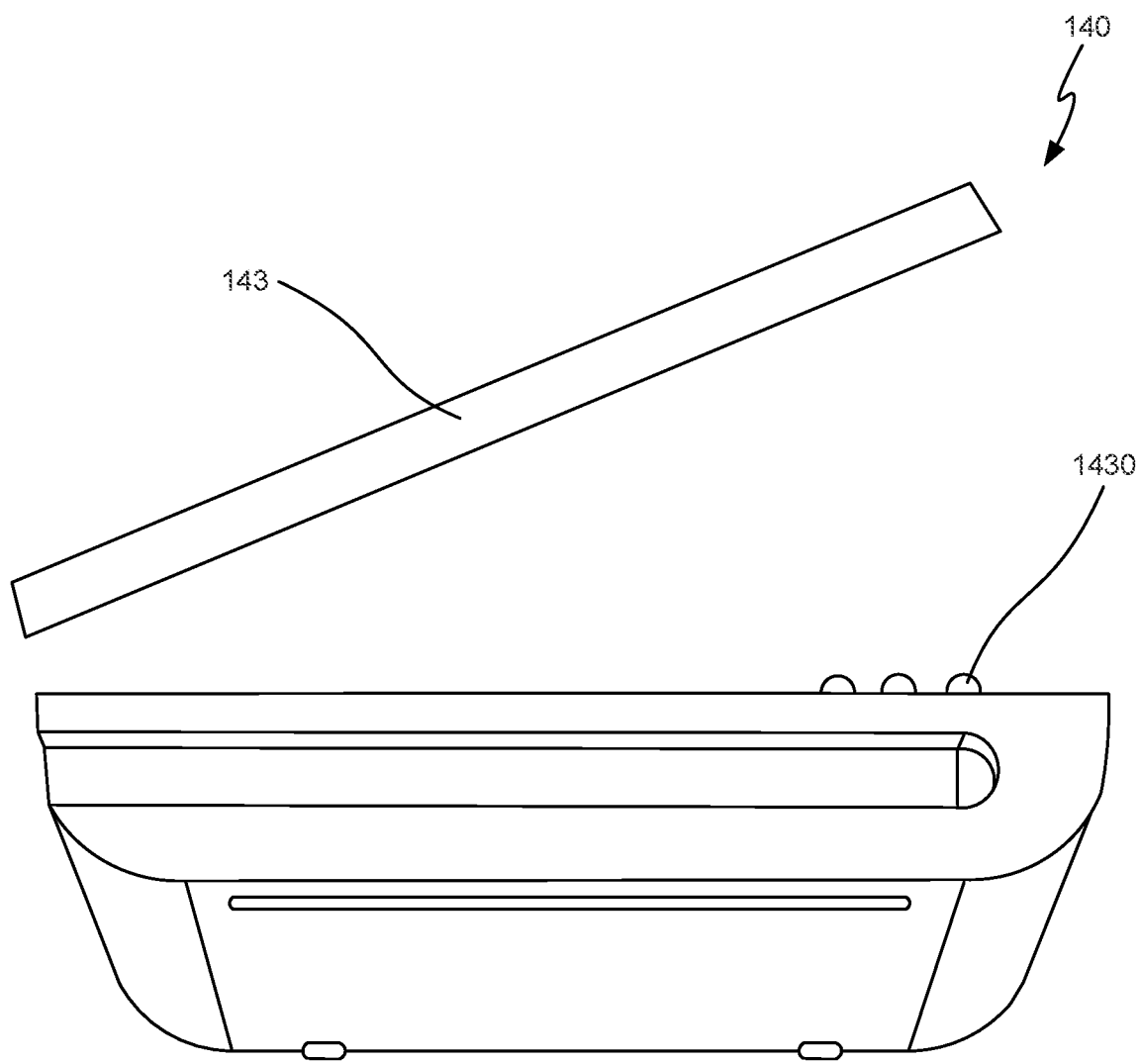
FIG. 14 is a rear view of a mouse module with a flat mouse button portion removed.

FIG. 14 is a rear view of a mouse module 140 with a removable flat top button portion 143 that has been removed. The removal of the top portion 143 exposes one or more electrical connectors 1430 that may engage with a handle portion to provide data to the mouse module 140 and, optionally, provide power and/or data to an attached handle portion. The flat top portion 143 may include one or more controls, such as a touch sensitive area that operates as a virtual scroll wheel so that an entire top surface 143 of the mouse module 140 is removed. In this example, the removal of a top surface of the mouse module allows improved engagement between a handle portion and the mouse module 140 and also the top portion can be replaced by a different top portion with an alternative button configuration, layout or physical design, such as a physical scroll wheel or multiple buttons or switches. Further, it enables a handle portion to be flusher with the mouse module 140 allowing the resultant mouse to be more adaptable to better support accessibility needs where size and profile of a mouse handle is of upmost importance to a user. In this, and in other examples, a removable mouse top portion may include only a front area of the mouse module or even a larger area where up to the entire top surface of the mouse module is removable.

Figure 15:
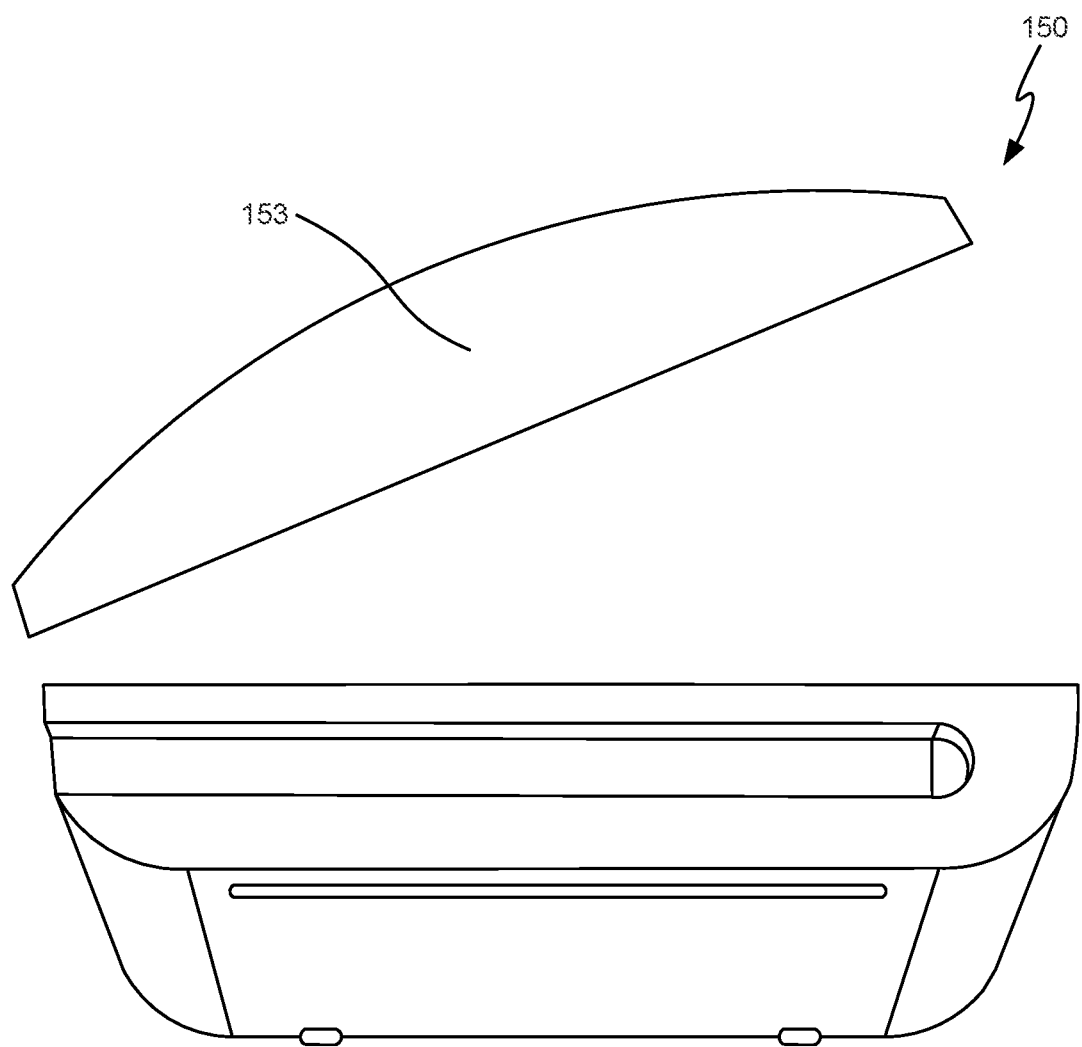
FIG. 15 is a rear view of a mouse module with a curved top portion removed.

FIG. 15 is a rear view of a mouse module 150 with a curved top portion 153 removed. This example further illustrates how the adaptability of a mouse portion 150 is improved by the removal of a portion or all of a top surface. Custom handle portions can be made to better fit a mouse module 150 with a flat upper surface, as opposed to the removed curved surface, that also has a thinner profile.

Figure 16:
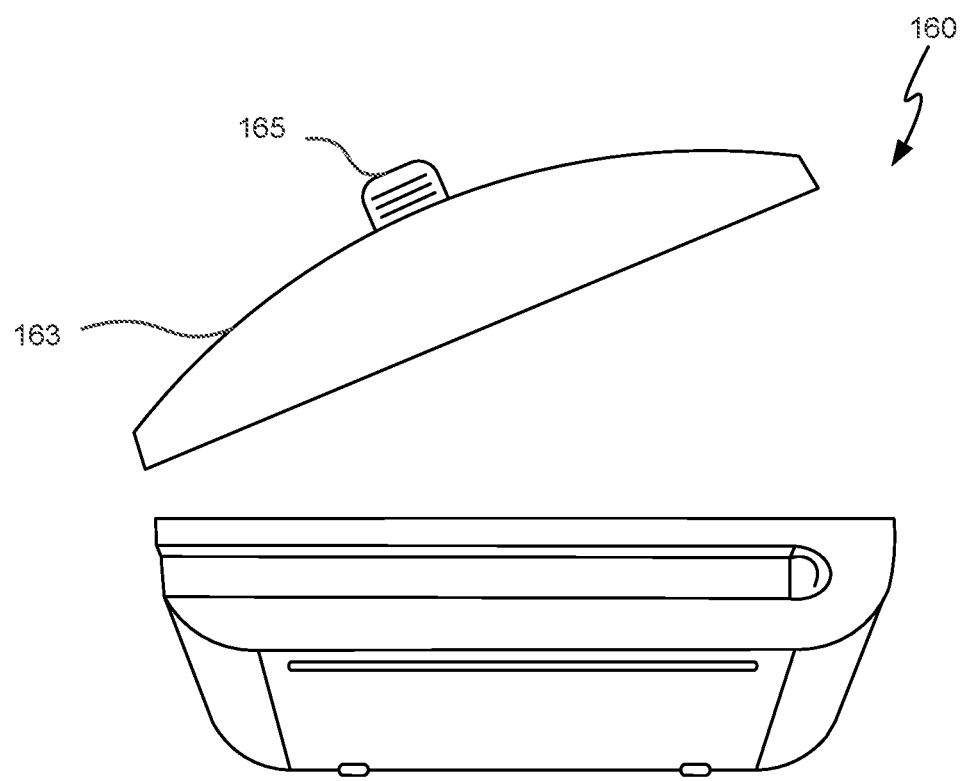
FIG. 16 is a rear view of a mouse module with a curved top portion including mouse scroll wheel removed.

FIG. 16 is a rear view of a mouse module 160 with a curved top portion 163, including an integral mouse scroll wheel 165, that is removable. The adaptability of the mouse module 160 is greatly improved by the removal of both the curved top surface 163 and also the removal of the physical mouse scroll wheel 165. The top surface 163 numerous curved surfaces make it difficult and imprecise to closely match an attachable handle portion; this problem is solved by the top portion being removable and, optionally, replicable with an alternative top portion with a different configuration. In some examples, functionality provided by one or more buttons and/or a scroll wheel may be lost by the removal of those components, however there is an overall gain to the accessibility of a mouse when a better fitting custom handle portion is provided.

Figure 17:
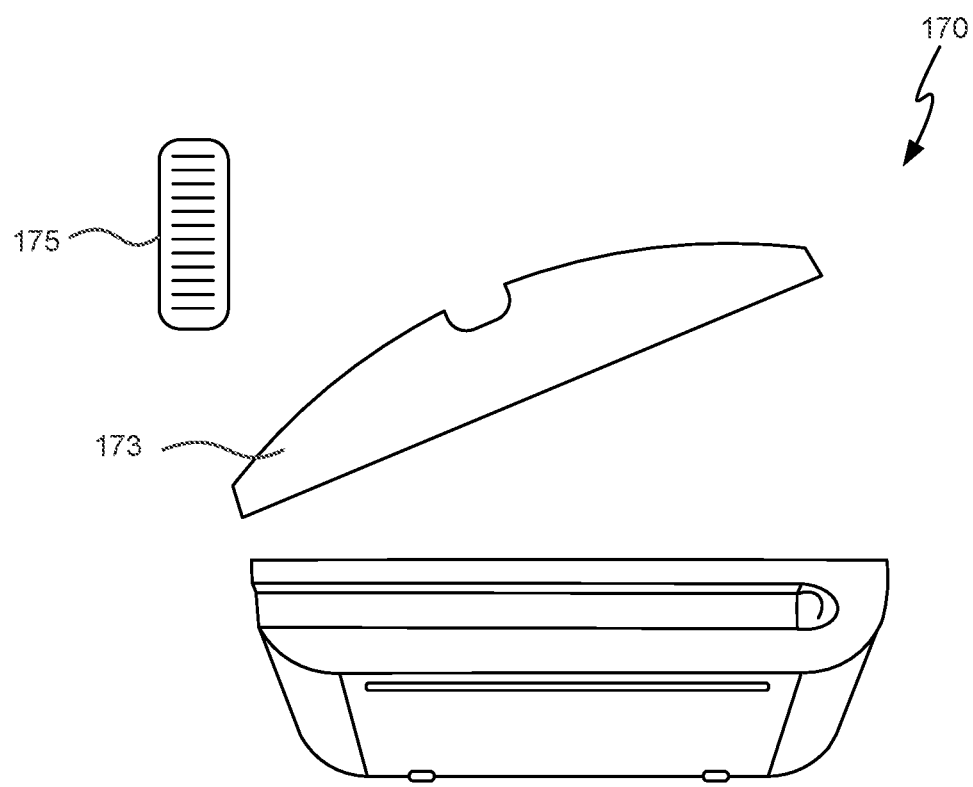
FIG. 17 is a rear view of a mouse module with a curved top portion removed to provide access to a mouse scroll wheel.

FIG. 17 is a rear view of a mouse module 170 with a curved top portion 173 removed to provide access to a mouse scroll wheel 175. In this example, a scroll wheel projecting from a top surface of a mouse module 170 can be removed or replaced for improved engagement between the mouse module 170 and a handle portion. Replacement of the scroll wheel 175 with an alternative scroll wheel provides a different ergonomic benefit to a user and allows for recycling of the modular mouse by providing an alternative design. Removal of the mouse wheel 175 and replacement of the top portion 173 will reduce the profile of the mouse providing the improved engagement between the mouse module 170 and a handle portion. Alternatively, the mouse wheel 175 may be replaced by one with a larger of small diameter so that it can better be used with a handle portion connected to the mouse module 170.

Figure 18:
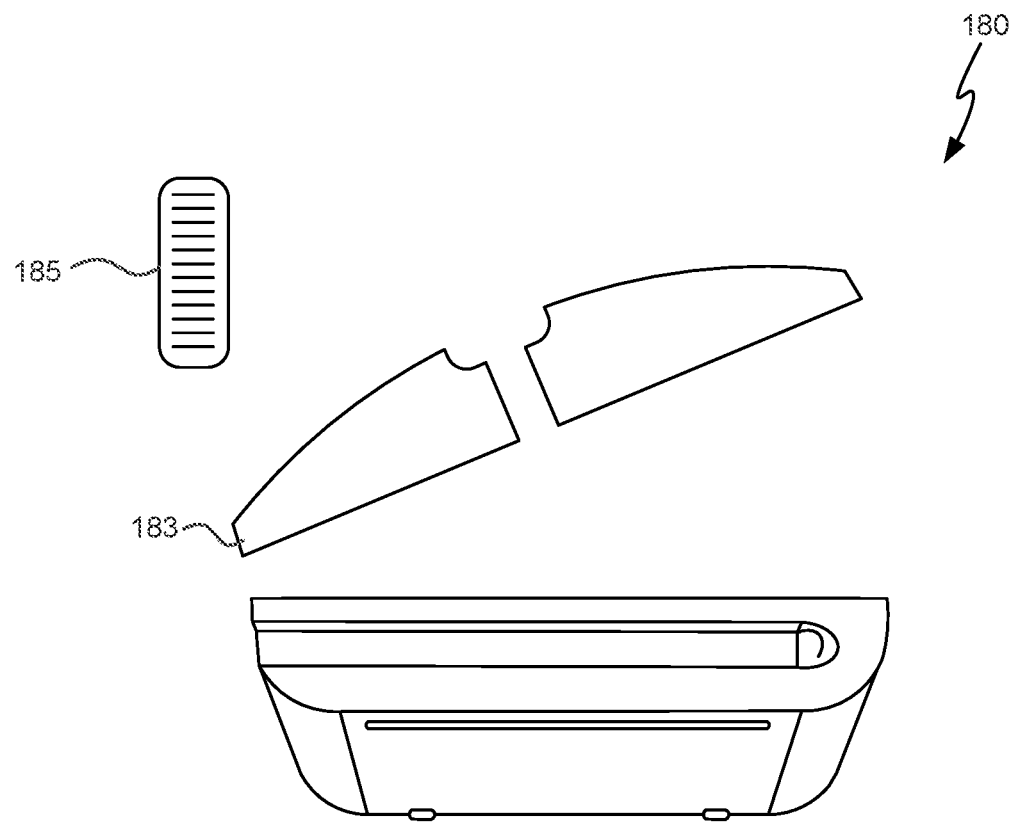
FIG. 18 is a rear view of a mouse module with button portions removed.

FIG. 18 is a rear view of a mouse module 180 with button portions 183 and a scroll wheel 185 removed. In this example, the button area is formed from at least two surfaces meaning that one or more may be removed in order to provide a suitable engagement with a handle portion to meet the accessibility requirements of a user.

Figure 19:
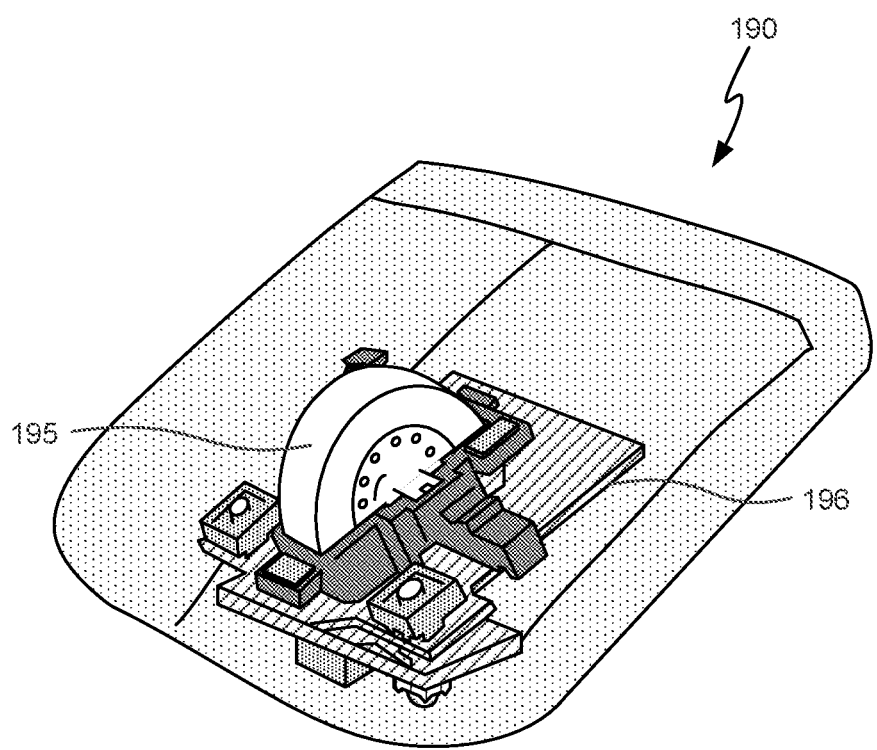
FIG. 19 is an isometric cutaway view of internal components of a mouse module.

FIG. 19 is an isometric cutaway view of internal components of a mouse module. A mouse wheel 195, movement sensor and press sensors to detect depression of the outer mouse buttons are formed as a small, compact unit on a printed circuit board (PCB) 196 within the mouse module 190 allowing removal of upper surfaces of the mouse module as illustrated in the preceding figures without exposing the more fragile internal components of the mouse module.

Figure 20E:
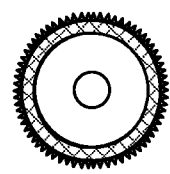
FIGS. 20A-20E illustrate exemplary sequential steps for modifying a mouse scroll wheel.
Figure 20D:
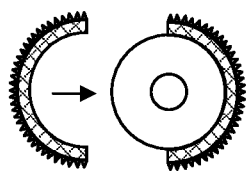
Figure 20C:
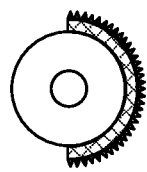
Figure 20B:
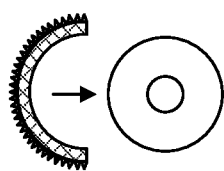
Figure 20A:
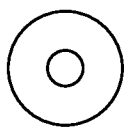

FIGS. 20A-20E illustrate exemplary sequential steps for modifying a mouse scroll wheel, in the illustrated example, the diameter of the scroll wheel is increase from the relatively small diameter illustrated in FIG. 20A to the relatively large diameter illustrated in FIG. 20E. In FIG. 20B, a partial section of an outer scroll wheel rim is applied to inner scroll wheel. The inner scroll wheel is rotated to expose a further section of the inner scroll wheel and a second partial section of the outer scroll wheel is applied to the inner scroll wheel in FIG. 20D. In the illustrated example, the outer wheel rim is formed of two equal-sized portions, however there may be more than two portions and the portions may not be equal in size. This example enables the outer material or grip of a scroll wheel to be changed or added while the scroll wheel remains attached to a mouse or mouse module. Optionally, the inner and outer parts of the scroll wheel components may be magnetically attracted to each other allowing a removable attachment, or the inner and outer scroll wheel components may have designated mounting features that physically engage with each other allowing a removable attachment.

Figure 21C:
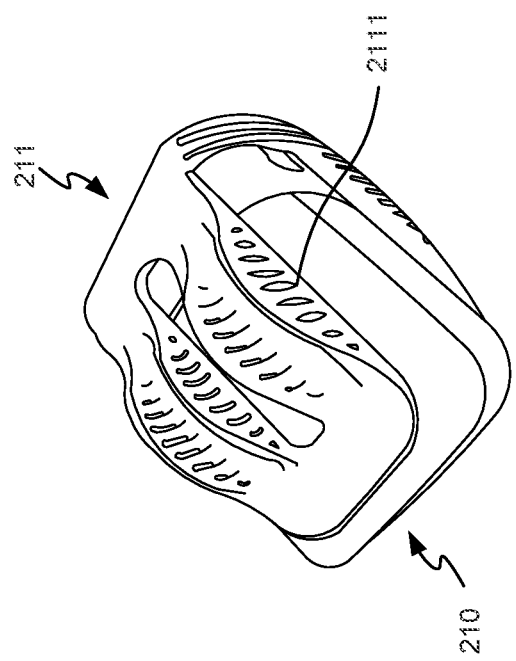
FIGS. 21A-21C illustrate isometric views of a computer mouse comprising the mouse module and a printed handle portion.
Figure 21A:
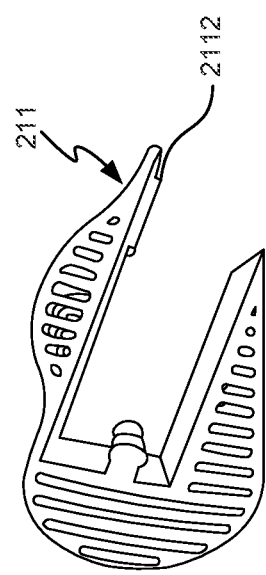
Figure 21B:
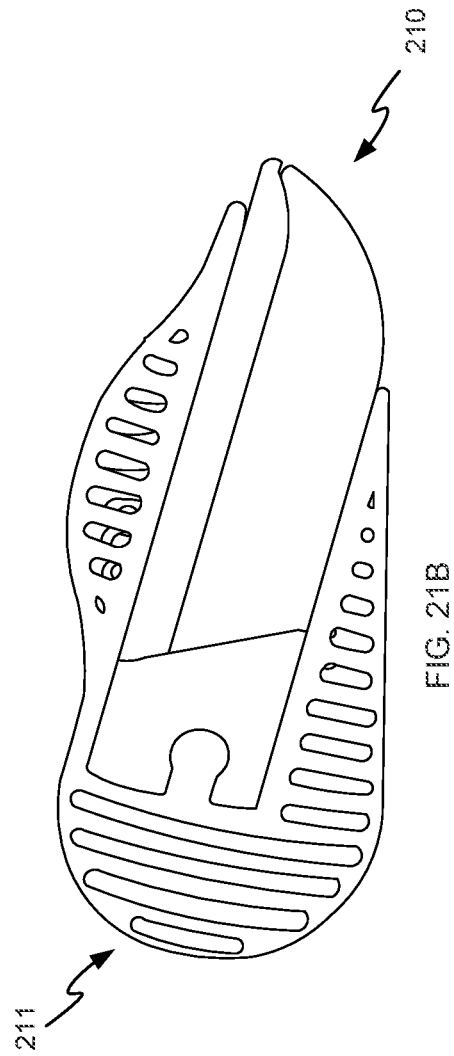

FIG. 21A-21C illustrate isometric views of a computer mouse comprising a mouse module 210 and an exemplary additively manufactured handle portion 211. The handle portion 211 encloses the mouse module 210 being on a top, bottom and rear surface of the mouse module 210. The handle 211 has two channels 2111 to support digits of a user. This example includes a handle 211 specifically designed to provide an accessible mouse when the handle portion 211 is attached to a modular mouse 210. A projection 2112 from the handle portion 211 ensures that pressure from a user into the channels 2111 will only provide a pressure to activate one of a plurality of buttons on the mouse module 21. Alternative exemplary mice designs are illustrated in FIGS. 1 and 2A, however none of the illustrated examples are to be understood as limiting examples of mouse handle portions and alternative handle portion designs may be provided to meet preferences or specific needs of users.

Figure 22B:
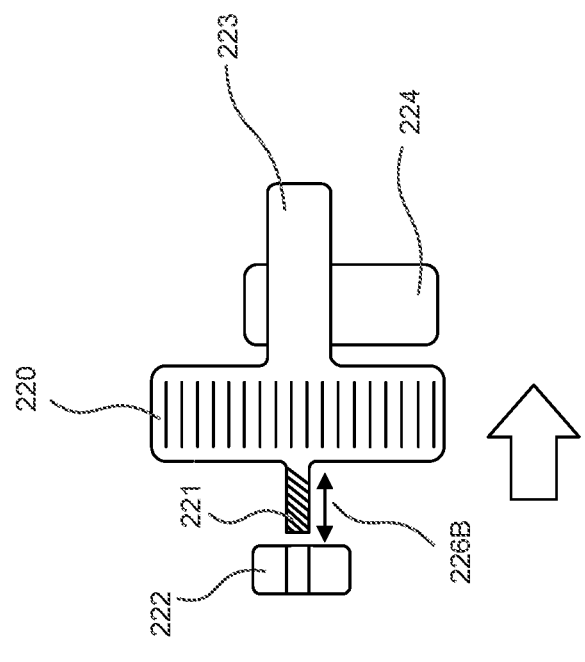
FIGS. 22A and 22B illustrate a cross-section of a detachable wheel structure.
Figure 22A:
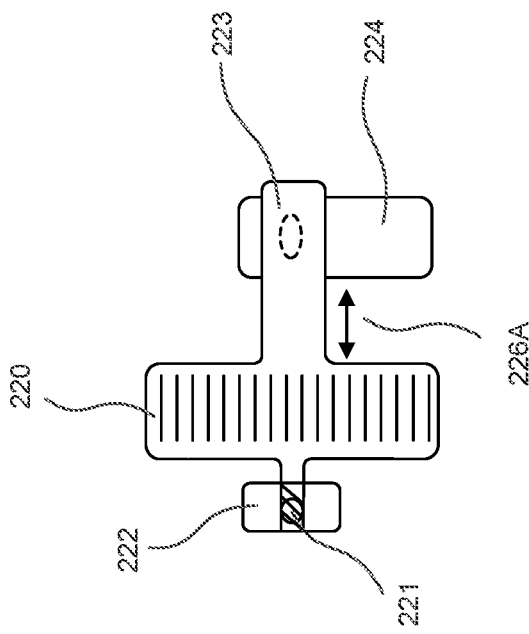
Figure 23B:
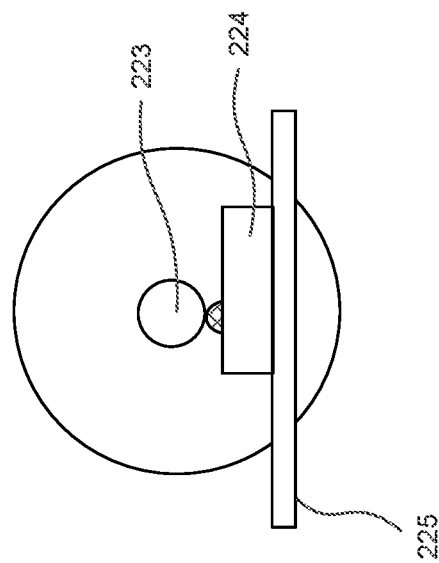
FIGS. 23A and 23B illustrate side views of the detachable wheel structures of FIGS. 22A and 22B.
Figure 23A:
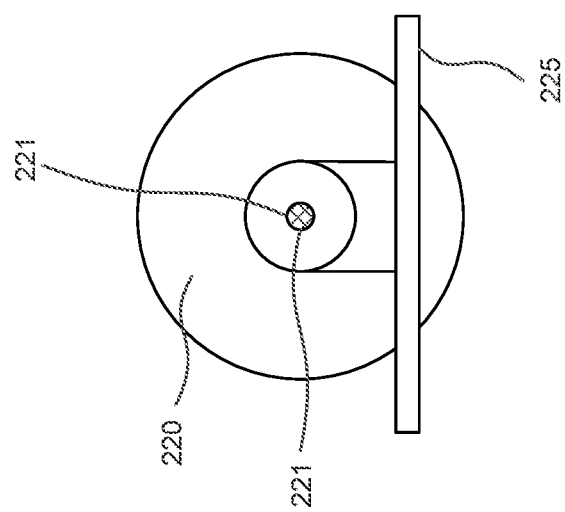

FIGS. 22A and 22B illustrate a cross-section of a detachable mouse wheel structure from a top down viewpoint and FIGS. 23A and 23B illustrate side views of the same detachable wheel structure. The exemplary structures and methods disclosed in and in relation to these figures may be used in conjunction with the mouse modules described elsewhere in this document, in the figures, one side of a mouse wheel 220 has an encoder shaft 221 for engaging with an encoder 222; the encoder 222 typically having a HEX head shape. The other side of the mouse wheel 220 has shaft 223 for pushing a middle button switch 224. There is a small gap 226A (e.g. 5 mm) between the wheel 220 and the middle button switch 224. The small gap 226A length is larger than encoder shaft 221 length. A typical mouse has no gap or a very small gap, so it is difficult to remove a mouse wheel part from a mouse body without dismantling both the mouse body and a printed circuit board (PCB) 225. Gap 226A enables the detachment of mouse wheel 222 from the mouse body without requiring a full dismantle of the mouse. An exemplary process for servicing or changing a mouse wheel comprises the steps of removing a top cover of the mouse component (not shown); sliding the mouse wheel 220 in the direction of the arrow illustrated in FIG. 22B to remove the encoder shaft 221 from the encoder 222; removing the original mouse wheel 220; inserting a new mouse wheel 220; sliding the new mouse wheel 220 in the opposite direction to the arrow illustrated in FIG. 22B to insert the encoder shaft 221 into the encoder 222; and replacing the top cover of the mouse component. This exemplary structure enables a user to use a personal or custom wheel, whereby the mouse wheel is custom not only in size but also in shape, color or material. A large wheel (e.g. around 25 mm diameter, around 6 mm width and with a rubber surface) provides good usability that may be beneficial to the productivity some users. Alternatively, a small wheel (e.g. around 20 mm diameter, around 4 mm width and with a metal surface) would provide a more usable mouse for other users. If a mouse wheel 222 is not required, this above-described method also enables its simple, easy and non-destructive removal of the mouse wheel 222 from the containing mouse.

Figure 24:
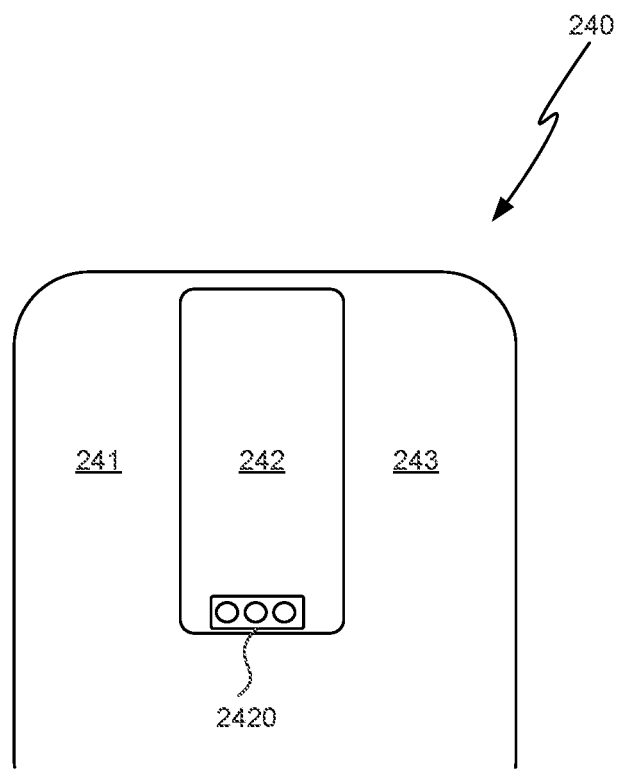
FIG. 24 illustrates a top view of a mouse module with a module pocket.

FIG. 24 illustrates a top view of a mouse module 240 having a left button 241, a right button 243 and a module pocket 242 positioned at a location corresponding to a typical mouse scroll wheel between the left button 241 and the right button 243. The module pocket 242 is a recess in the mouse module 24 with a signal connector 2420 comprising of a plurality of electrical connectors—three are illustrated in the figure and in other figures, however, the number and layout of the connectors/pins are not intended to be a limiting in the examples. Wheel module 260 illustrated in FIG. 26a may be inserted into the module pocket 242 of mouse module 240. Wheel module 260 illustrated in FIGS. 26a and 26b has a signal connector comprising of a plurality of electrical connectors. The wheel module signal connector contacts with module pocket signal connector 2420 to provide a mouse scroll wheel function with a middle button activated by pushing the wheel downwards. If this module structure is used only for a mouse wheel, a 4-pin signal connection may be sufficient. However, alternative signal structures, protocols and connections may be used, for example, a I²C protocol may be operated using a 3-pin connection, a Joint Asynchronous Communications, Device Agnostic Control (JACDAC) protocol may be operated using a 3-pin connection, and a Serial Peripheral Interface (SPI) protocol that may be operated using a 4-pin connection. Above is described how the wheel module 261 of FIGS. 26a and 26b may be inserted into the module pocket 242 of mouse module 240, however alternative functional modules maybe inserted into the module pocket 242 and thereby connected with the mouse module 240 to provide additional or alternative functionality.

Exemplary mouse modules are illustrated in FIGS. 26A-32 and each provides different capabilities or configurations for a mouse module coupled to the mouse module and also to a mouse containing such a mouse module.

FIGS. 26A-32 illustrate example modules to engage with a mouse module whereby respective electrical connectors are also engaged, where present.

Figures 26A, 26B:
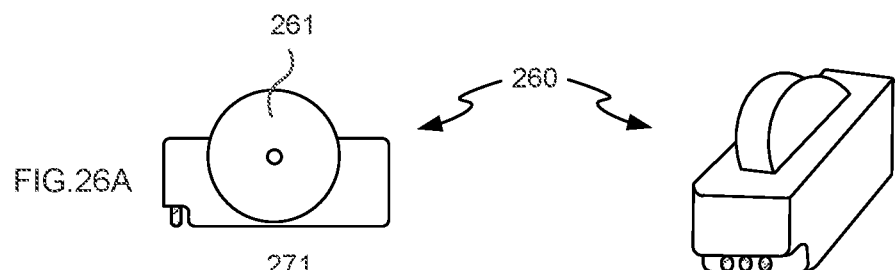
FIG. 26A is a schematic side view of a large wheel module.
FIG. 26B is an isometric view of the large wheel module of FIG. 26A.

FIGS. 26A and 26B illustrate a large wheel module 260. The 'large' wheel 261 may be around 25 mm in diameter, 6 mm in width and have a rubber surface.

Figure 27:
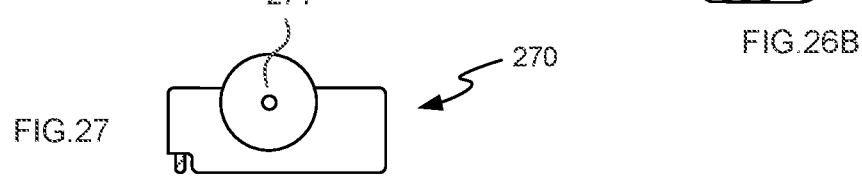
FIG. 27 is a schematic side view of a small wheel module.

FIG. 27 illustrates a small wheel module 270. The 'small' mouse wheel may be around 20 mm in diameter, 4 mm in width and have a metal surface.

Figures 28A, 28B:
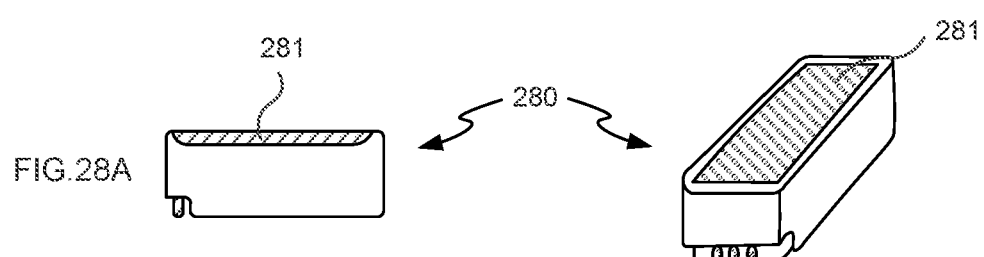
FIG. 28A is a schematic side view of a touch strip module.
FIG. 28B is an isometric view of the touch strip button module of FIG. 28A.

FIGS. 28A and 28B illustrate a touch strip module 280 that includes a flat touch-sensitive surface 281. The touch-sensitive surface 281 may utilize a capacitive touch sensor and be used provide mouse wheel functionality or may be able to detect a touch sensitive input tracking in up to two dimensions (across the surface) and also a force of a touch.

Figure 29:
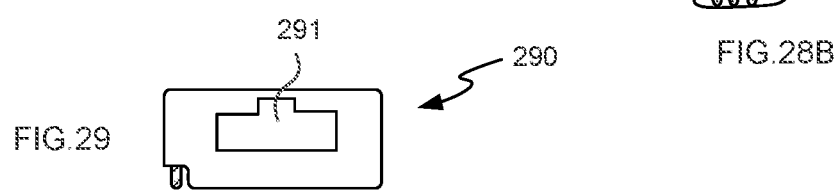
FIG. 29 is a schematic side view of a button module.

FIG. 29 illustrates a button module 290 that can be used with the mouse module 240 of FIG. 24 to provide s 3-button mouse configuration that would be beneficial for performing Computer Aided Design operations. The button module 290 encloses a button 291 for detecting a force associated with a button press.

Figure 31:
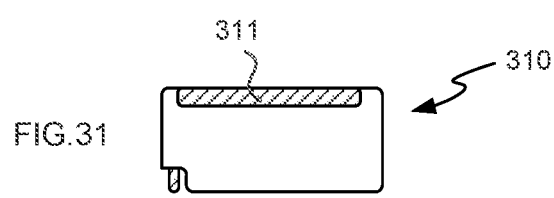
FIG. 31 is a schematic side view of a display module.

FIG. 31 illustrates a display module 310 that provides display 311 on a mouse module when the display module 310 is attached thereto. The display 311 may comprise an LCD screen and be driven by a processor within a mouse module or within the display module 310.

Figure 32:
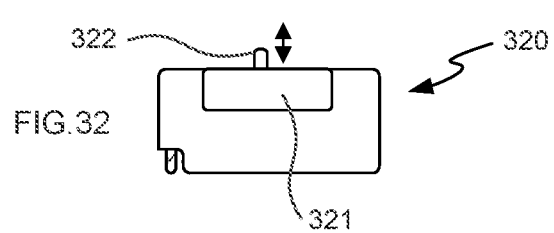
FIG. 32 is a schematic side view of an actuation module.

FIG. 32 illustrates an actuator module 320 comprising an actuator 321 and a pin 322 for providing information to a user by tactile means. In one example, a mouse module may provide information to a user in a braille format.

Figure 30:
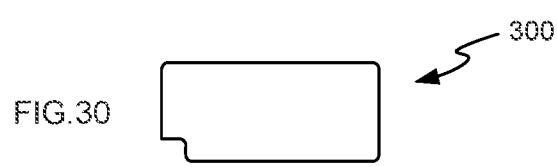
FIG. 30 is a schematic side view of a dummy module.

If a user does not want to use one or more functions in a mouse module, a dummy module 300 can be used such as that illustrated in FIG. 30. The dummy module 300 has no electrical connectors. All other modules are illustrated with electrical connectors which, as described, may vary in number, size, position and format.

Figure 25:
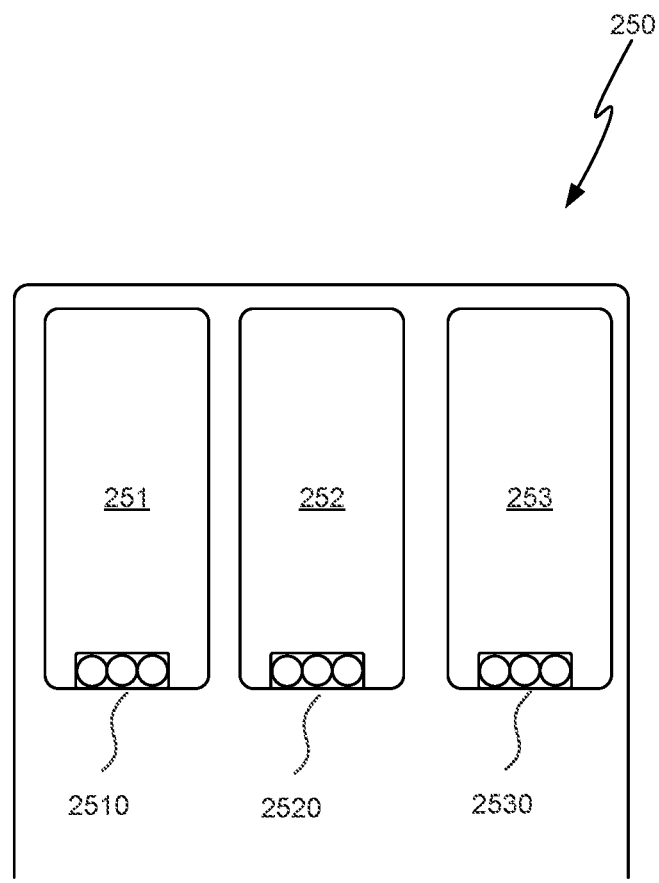
FIG. 25 illustrates a top view of a mouse module with three module pockets.

FIG. 25 illustrates a second mouse module 250 that provides three module pockets: a left module pocket 251, a middle module pocket 252 and a right module pocket 253. This second mouse module 250 may be customized and enhanced with the addition of multiple mouse modules including but not limited to those types described above. All three module pockets 251, 252, 253 are compatible with all of the described modules as each of the three module pockets 251, 252, 253 has electrical connections 2510, 2520, 2530 that can be used to power and control respective modules as well as receive data from respective modules, as required. Any combination of modules may be configured, such as button/wheel/button, button/button/wheel, wheel/wheel/display, etc. An alternative configuration that is not illustrated is that of a large touch panel module that is a single unit that occupies all three module pockets that can provide 2D scrolling or other multi-finger touch functionality. This large touch panel module may couple to the electrical connectors of a single module pocket, such as the middle module pocket 252, for example.

In this document we describe a handle portion for a mouse module that can be repeatedly detached and reattached. The handle portion may be swapped for another handle portion with a connector that is reciprocal with that of the mouse module to the extent that engagement between the mouse module and the mouse handle portion is maintained during use of a mouse comprising the mouse module and the mouse handle portion. The engagement may be maintained by one or more of reciprocal male and female portion(s) on the mouse module and mouse handle portion, a magnetic force acting between the mouse module and mouse handle portion, a friction fit between one or more male and female portions in a plug and socket arrangement, or the like. A connection or disconnection between a mouse module and a mouse handle portion may be performed with a sliding engagement from any side (top, bottom, left or right) of the mouse module with respect to the handle portion as illustrated in the figures. Alternatively, the connection or disconnection may be performed using a twisting motion if either the mouse module or mouse handle portion is provided with a helical projection and the respective other of the mouse module or the mouse handle portion is provided with a reciprocal connection to the helical projection. Non-fastening projections from either or both the mouse module or mouse handle portion may help retain the engagement of the mouse module and mouse handle portion. Further, in the figures the male physical connectors are illustrated as being largely round in cross section, however their cross-section may be irregular and/or angular. The handle portion is a portion of a mouse designed to be held or grasped by a user of the mouse with the handle portion arranged and sized to fit within the palm of the user of the mouse. In one example, the mouse module is arranged such that the movement sensor would not be directed to a surface if the mouse module was placed flat on the surface. In use, a handle portion attached to the mouse module may be required to maintain an angle between a lower surface of the Mouse module and the surface against which movement is detected by the movement sensor. In a different example, a mouse module comprises a movement sensor that is arranged towards a surface when the mouse module is laid flat on the surface, supported neither by a handle portion nor by a user.

Alternatively, or in addition, the functionality described for a mouse module is performed, at least in part, by one or more hardware logic components contained within the mouse module. For example, and without limitation, illustrative types of hardware logic components that are optionally used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs) and Computer Processing Units (CPUs). The one or more hardware logic components are operable to receive and transmit data between components of the mouse module. The one or more hardware logic components may be further operable to control the receiving and transmission of data between components within the mouse module and components within the mouse handle portion using one or more protocols. In this manner, devices within the handle portion may be controlled by the one or more hardware logic components. If a mouse handle portion comprises one or more sensors, data collected from such one or more sensors may be transmitted to the one or more hardware logic components. The one or more hardware logic components may be yet further operable to receive and transmit data between components within the mouse module and a connected computer.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

Although above examples may be described in relation to battery powered mice having a battery compartment, alternative examples include wired mouse modules that are externally powered and do not have a battery or battery compartment. A wired mouse may be powered by a wired connection that provides both power and transmits data along its length between connected devices such as, for example, a mouse module and a computer. In one such example, the connection may be a USB connection and the mouse module includes a USB transceiver or the like. A further alternative may replace the battery with one or more capacitors or one or more super capacitors that use motion of the mouse module to generate a charge that is stored in the capacitor(s)/super capacitor(s), The stored charge may be used later to power the modular mouse.

Above we describe that a mouse handle may be formed using an additive manufacturing technique, which allows ease of prototyping and a custom mouse handle design for an individual user; however, a mouse handle may also be produced using a rapid manufacturing technique or another technique that forms a mouse handle by adding material or removing material.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to an item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of examples. Although various examples have been described above with a certain degree of particularity, or with reference to one or more individual examples, those skilled in the art could make numerous alterations to the disclosed examples without departing from the scope of this specification.

The invention claimed is:

1. A computer mouse module comprising:
    a power supply component;
    a movement sensor configured to detect movement of the computer mouse module on a surface;
    an encoder operable to encode data collected by the movement sensor;
    a transmitter for transmitting the encoded data to a computer; and
    a physical connector for detachably attaching a handle portion to the computer mouse module such that a length of the computer mouse module is supported by the handle portion at a non-parallel angle with the surface, wherein the handle portion is moved in a lateral direction relative to the length of the computer mouse module to detachably attach the handle portion to the computer mouse module.

2. The computer mouse module of claim 1 further comprising a scroll wheel portion, wherein the scroll wheel portion comprises at least one of a scroll wheel or a scroll wheel connector for detachably attaching a scroll wheel to the computer mouse module, wherein a diameter of the scroll wheel is adjustable while the scroll wheel remains within the computer mouse module.

3. The computer mouse module of claim 2, wherein the scroll wheel has a rim that is reconfigurable whereby rims of different thicknesses are detachably attachable to alter the diameter of the scroll wheel.

4. The computer mouse module of claim 1 further comprising a button portion, wherein the button portion comprises:
    a mouse button; or
    a mouse button connector for detachably attaching a mouse button to the computer mouse module.

5. The computer mouse module of claim 4, wherein the mouse button comprises a button, a touch sensitive area, a visual display, or an actuator.

6. The computer mouse module of claim 4, wherein
    the button portion is located towards a first end of the computer mouse module,
    the physical connector is located towards a second end of the computer mouse module, and
    the first end is opposite to the second end.

7. The computer mouse module of claim 6 further comprising a magnet at the second end.

8. The computer mouse module of claim 1 further comprising an electrical connection configured to at least one of: supply power to the handle portion, or transmit a control signal to and/or from the handle portion.

9. The computer mouse module of claim 1, further comprising hardware logic, wherein the hardware logic is operable to transmit a control signal to the handle portion instructing the handle portion to initiate a vibration function.

10. The computer mouse module of claim 1, wherein the physical connector is a channel in the computer mouse module arranged to receive a projection of the handle portion.

11. The computer mouse module of claim 1, wherein the physical connector further comprises a biased projection extending from the physical connector.

12. The computer mouse module of claim 1 further comprising a removable module, wherein the removable module provides functionality of at least one of a scroll wheel, a touch sensitive area, a mouse button, a display, or an actuated surface.

13. The computer mouse module of claim 1, wherein the power supply component comprises at least one of a battery, a battery compartment for receiving a battery, or a wired connection for receiving power from a power supply.

14. The computer mouse module of claim 1, wherein the handle portion is arc shaped.

15. The computer mouse module of claim 1, wherein a front part of the computer mouse module and a rear part of the handle portion contact the surface such that a middle section of at least one of the computer mouse module or the handle portion is supported above the surface.

16. The computer mouse module of claim 1, wherein a middle section of at least one of the computer mouse module or the handle portion forms a bridge between a front part of the computer mouse module and a rear part of the handle portion.

17. A computer mouse comprising
    a handle portion, wherein the handle portion comprises a handle portion physical connector; and
    a computer mouse module, wherein the computer mouse module comprises:
        a power supply component,
        a movement sensor configured to detect movement of the computer mouse module on a surface,
        an encoder operable to encode data collected by the movement sensor,
        a transmitter for transmitting the encoded data to a computer, and
        a computer mouse module physical connector; and
    wherein the handle portion physical connector engages with the computer mouse module physical connector to detachably attach the handle portion to the computer mouse module such that a length of the computer mouse module is supported by the handle portion at a non-parallel angle with the surface, wherein the handle portion is moved in a lateral direction relative to the length of the computer mouse module to detachably attach the handle portion to the computer mouse module.

18. The computer mouse according to claim 17, wherein the computer mouse module is electrically connected to the handle portion and is arranged to provide electrical power to the handle portion.

19. The computer mouse of claim 17, wherein the handle portion arc shaped.

20. A method for assembling a computer mouse comprising:
    detachably attaching a handle portion to a computer mouse module such that a length of the computer mouse module is supported by the handle portion at a non-parallel angle with a surface, wherein detachably attaching the handle portion to the computer mouse module comprises moving the handle portion in a lateral direction relative to the length of the computer mouse module, wherein the computer mouse module comprises:
  a power supply component,
  a movement sensor configured to detect movement of the computer mouse module on the surface,
  an encoder operable to encode data collected by the movement sensor,
  a transmitter for transmitting the encoded data to a computer, and
  a physical connector; and
the handle portion comprises a physical connector that is reciprocal to the physical connector of the computer mouse module.

* * * * *